United States Patent Office 3,832,372
Patented Aug. 27, 1974

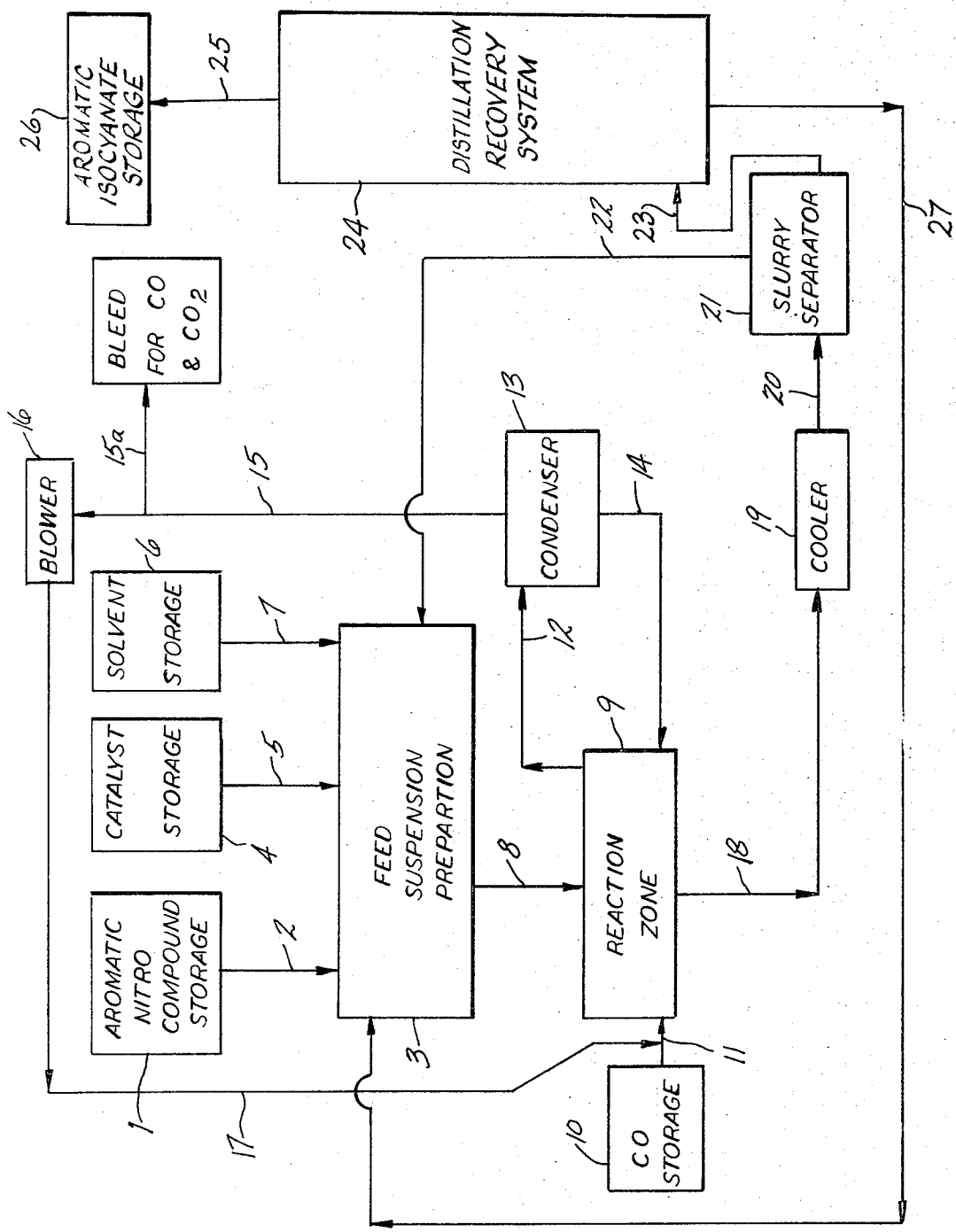

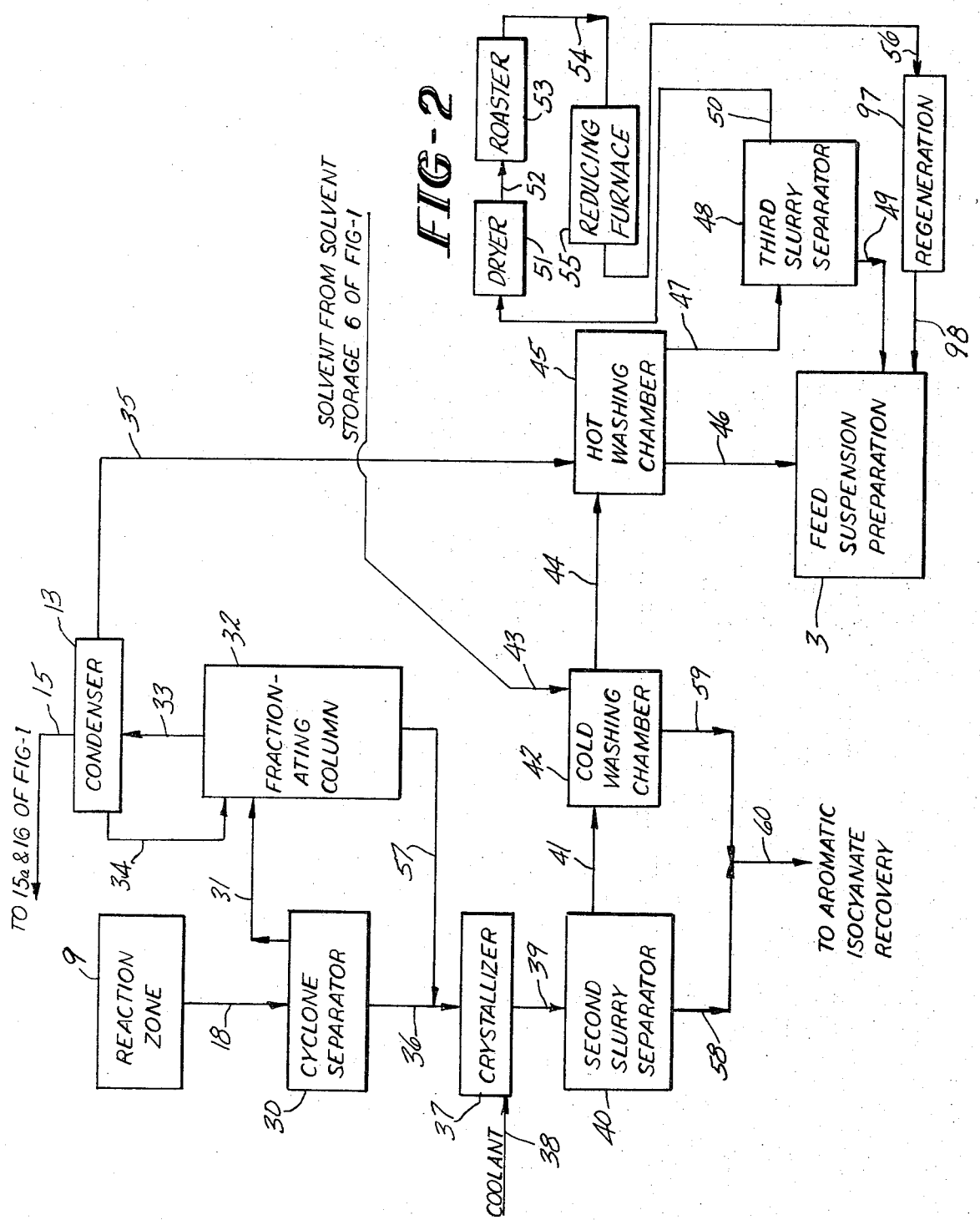

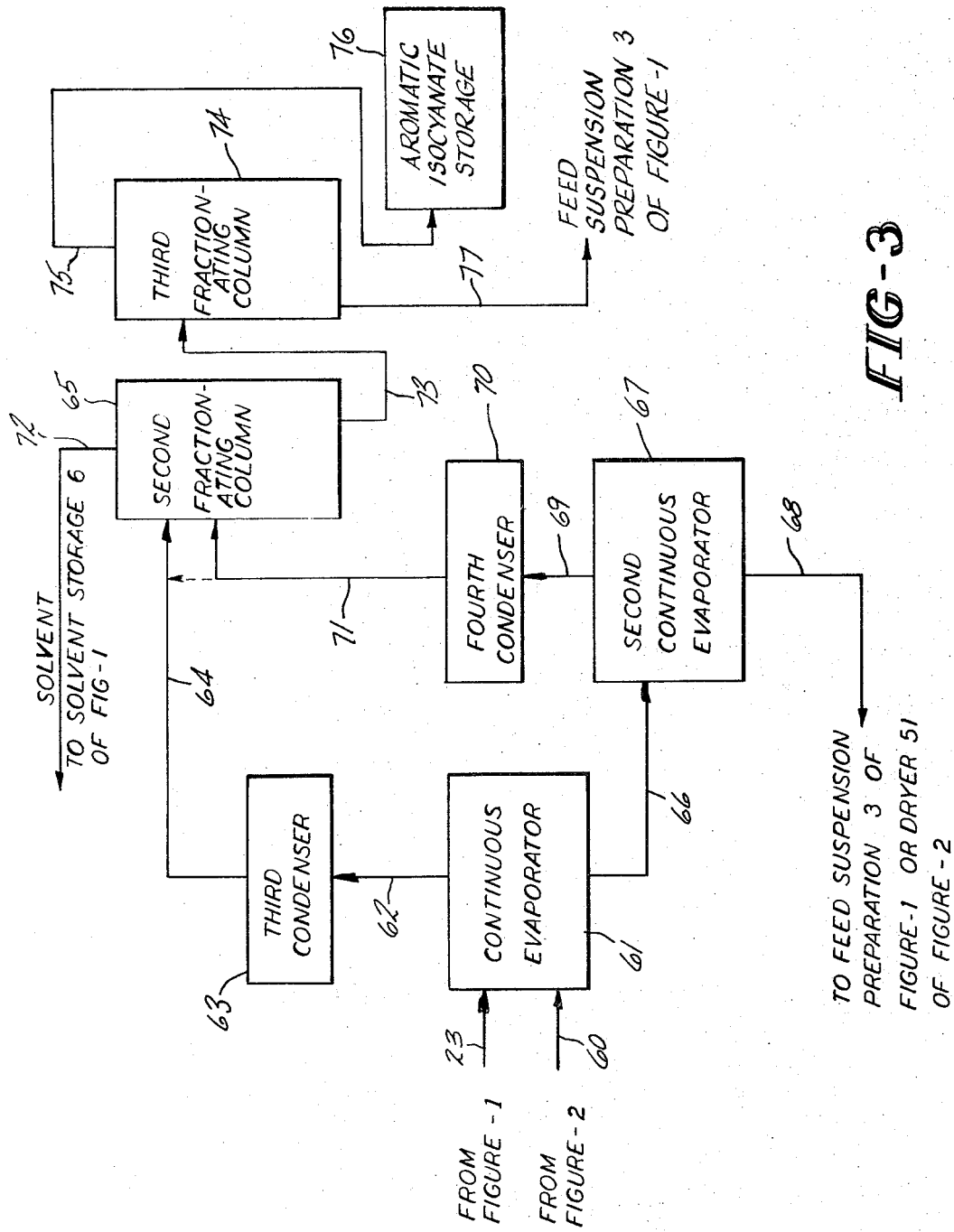

3,832,372
CONTINUOUS PROCESS FOR PREPARING AROMATIC ISOCYANATES
Philip D. Hammond and William M. Clarke, North Haven, and William I. Denton, Cheshire, Conn., assignors to Olin Corporation
Filed Oct. 12, 1972, Ser. No. 296,952
Int. Cl. C07c *119/04*
U.S. Cl. 260—453 PC                   16 Claims

ABSTRACT OF THE DISCLOSURE

Aromatic isocyanates are produced directly from aromatic nitro compounds in a continuous process in which cabron monoxide and an aromatic nitro compound are reacted in a reaction zone in the presence of a catalyst and a solvent to form an aromatic isocyanate. A gaseous product of the reaction zone is collected and cooled to yield a fraction of unreacted carbon monoxide in gaseous form, which is condensed, purified and recycled to the reaction zone, and another fraction of liquified solvent, which is also recycled to the reaction zone. The slurry product of the reaction zone is collected, cooled and separated into a solid component and a liquid component. The solid component, which is predominantly catalyst, is recycled to the reaction zone with or without regeneration. The liquid component is distilled to separate aromatic isocyanate product from the distillation residue which predominates in unreacted aromatic nitro compound and solvent, the latter residue being recycled to the reaction zone. The aromatic isocyanate product is useful as a reactant in the preparation of polyurethanes.

This invention relates to a continuous process for preparing aromatic iscyanates directly from aromatic nitro compounds.

Considerable effort has been expended recently in developing processes for preparing aromatic isocyanates directly from aromatic nitro compounds by reacting the aromatic nitro compound with carbon monoxide in the presence of a noble metal catalyst, particularly palladium halides and rhodium halides, and generally utilizing a co-catalyst. For example, U.S. Pat. No. 3,576,835 discloses the use of catalysts comprised of a noble metal halide and a heteroaromatic nitrogen compound. In addition, U.S. Pat. No. 3,523,966 discloses the use of a mixture of a noble metal-based catalyst and certain non-noble metal-based catalysts. Although the techniques described in these patents are useful in preparing aromatic isocyanates, there is a need for improving the economics of these techniques in order to make the processes more profitable. Since expensive noble metal catalysts are utilized in these processes, the capital cost for these processes is large. Therefore, some means is necessary to regenerate and/or reuse the catalyst, and thereby reduce the capital outlay for catalyst. In addition, the unreacted aromatic nitro compound, carbon monoxide, solvent and in the case of polynitro compounds, incompletely reacted aromatic nitro compounds, need to be reused and reprocessed in order to improve the economics of the reaction.

Aromatic isocyanates are becoming more and more important as a reactant in the preparation of polyurethanes, particularly polyurethane foams, which in their rigid form find utility as insulation and in their flexible form find utility as cushioning materials and carpet-backing materials.

It is a primary object of this invention to provide an improved process for preparing aromatic isocyanates.

A further object of this invention to provide a continuous process for preparing aromatic isocyanates directly from aromatic nitro compounds.

Still another object of this invention is to provide improved process for preparing toluene diisocyanate from dinitro tolylene.

These and other objects of the invention will become apparent from the following detailed description thereof.

It has now been discovered that the foregoing objects are accomplished in the preparation of aromatic isocyanates when carbon monoxide and an aromatic nitro compound are continuously reacted in a reaction zone in the presence of a catalyst and a solvent to form a first gaseous product and a slurry product. The first gaseous product of the reaction zone is cooled to form a second gaseous product and a liquid product. The second gaseous product contains carbon monoxide and carbon dioxide in gaseous form, which is processed to remove carbon dioxide, then admixed with additional carbon monoxide and recycled to the reaction zone. The liquid product is predominantly liquified solvent, which may also be recycled to the reaction zone. The slurry product of the reaction zone is cooled and separated into a solid component and a liquid component. The solid component, which is predominantly catalyst, is recycled to the reaction zone with or without regeneration. The liquid component is distilled to separate aromatic isocyanate products from the distillation residue, which predominates in unreacted aromatic nitro compound and solvent. Catalyst components are recovered from the latter residue and recycled to the reaction zone. The aromatic isocyanate product is useful as a reactant in the preparation of polyurethanes.

FIG. 1 is a schematic diagram of one embodiment of the invention.

FIG. 2 is a schematic diagram of another embodiment of the invention showing a technique for separating solvent and a technique for regenerating catalyst.

FIG. 3 is a schematic diagram of another embodiment of the invention showing a preferred technique for separating aromatic isocyanate products from the liquid component formed in the reaction.

As illustrated in FIG. 1, aromatic nitro compound is conveyed from aromatic nitro compound storage 1 through aromatic nitro compound feed line 2 to feed suspension preparation 3. Catalyst is conveyed from catalyst storage 4 to catalyst feed line 5 to feed suspension preparation 3. Solvent is conveyed from solvent storage 6 through solvent feed line 7 to feed suspension preparation 3. Aromatic nitro compound, catalyst and solvent are each fed to feed suspension preparation 3 by either automatic or manual feed mechanisms (not shown), but it is preferred to maintain a continuous and substantially uniform feed rate for each component in order to maintain the continuous process as close to equilibrium as possible.

Aromatic nitro compound, catalyst, solvent and various recylcle streams discussed more fully below are admixed in feed suspension preparation 3 by any convenient means such as a motor driven agitator (not shown) to form a substantially homogenous suspension of solid catalyst in the solution of solvent and aromatic nitro compound. The resulting feed suspension in slurry form is conveyed through feed suspension feed line 8 to reaction zone 9, using either manual or automatic feed rate control means (not shown).

Carbon monoxide is fed from carbon monoxide storage 10 through carbon monoxide feed line 11 through a suitable gas dispersion means such as a gas sparger (not shown) to reaction zone 9. The gas sparger is positioned in the lower portion of the reaction zone 9 to permit the dispersed gaseous carbon monoxide to travel the longest path possible through the reaction mass in reaction zone 9. Feed suspension, carbon monoxide and a solvent recle stream described more fully below are admixed in the reaction zone by any suitable means such as a motor driven agitator (not shown) in order to obtain a uniform mixture of the components of the feed suspension and the dispersed carbon monoxide. Reaction zone 9 is of suitable construction to permit operation at pressures up of about 10,000 p.s.i.g. and at temperatures up to about 245° C., but pressures as high as 30,000 p.s.i.g. and temperatures as high as 250° C. may be employed if desired. The reaction zone 9 is provided with suitable pressure control and heating means to achieve control of these conditions during reaction.

A first gaseous reaction product is drawn from reaction zone 9 through a first gaseous reaction product discharge line 12 to condenser 13. The first gaseous reaction product contains unreacted carbon monoxide, by-product carbon dioxide, and some of the solvent in vapor form, along with other gaseous by-products of the reaction. Condenser 13 effects condensation of the vaporized solvent which is returned through liquid condensate discharge 14 to reaction zone 9. Uncondensed gases from condenser 13 form a second gaseous product which is conveyed through second gaseous product discharge line 15 to a suitable gas conveying means such as a blower 16. A portion of the second gaseous product may be bled off of second gaseous product line 15 through bleed line 15a to remove carbon dioxide and carbon monoxide from the system. Blower 16 conveys the remaining portion of the second gaseous product through second gaseous product recycle line 17 to carbon monoxide feed line 11 (as shown), or to a suitable gas dispersion means such as a sparger (not shown) in reaction zone 9. The remaining portion of the second gaseous product is admixed with sufficient carbon monoxide from carbon monoxide storage 10 to maintain the desired carbon monoxide to carbon dioxide ratio in carbon monoxide feed line 11.

A slurry of catalyst suspended in a solution of aromatic isocyanate, solvent and unreacted or partially reacted aromatic nitro compound, if any, is withdrawn from reaction zone 9 through first slurry reaction product discharge line 18, preferably conveyed to cooler 19 for cooling to a temperature from about 10 to about 50° C., and then conveyed through cooler discharge line 20 to a suitable slurry separator 21, such as a filter. The rate of discharge of first slurry reaction product is adjusted to maintain a residence time of reactants such as aromatic nitro compound in reaction zone 9 equivalent to between about 5 and about 600 minutes, and preferably between about 10 and about 60 minutes. In addition, the feed rate of the feed suspension through feed suspension feed line 8 and the discharge rate of the slurry reaction product through first slurry reaction product discharge line 18 from reaction zone 9 are controlled to maintain a slurry level in the reaction zone which is generally between about 60 and about 90 and preferably between about 60 and about 90 and preferably between about 70 and about 80 percent of the height of reaction zone 9.

Solid component from slurry separator 21, which is a wet cake when a filter is used, is conveyed by means of solid component recycle line 22 to feed suspension preparation 3 where it is admixed with additional aromatic nitro compound, catalyst and solvent for further reaction with carbon monoxide in reaction zone 9.

Liquid component from slurry separator 21 is conveyed through liquid component discharge line 23 to distillation recovery system 24. The liquid component contains the aromatic isocyanate product, solvent, and unreacted or incompletely reacted aromatic nitro compound, if any, along with any other liquid reaction products. In distillation recovery system 24 aromatic isocyanate is distilled off in the overhead and conveyed through distillation product discharge line 25 through a suitable condenser (not shown) to aromatic isocyanate storage 26. A portion of the distillation residue from distillation recovery system 24 is conveyed through distillation residue recycle line 27 to feed suspension preparation 3, the remaining portion being conveyed to a catalyst regeneration system (not shown).

FIG. 2 illustrates another embodiment of the invention showing a technique for solvent separation and a technique for catalyst regeneration. As illustrated in FIG. 2, the slurry reaction product is conveyed from reaction zone 9 (of FIG. 1) through first slurry reaction product discharge line 18 (of FIG. 1) to a cyclone separator 30 or other suitable apparatus for disengaging the vapors of solvent, aromatic isocyanates, carbon monoxide and carbon dioxide from the concentrated suspension of catalyst solids in the solvent, aromatic isocyanates, by-products and unreacted aromatic nitro compound, if any. The vapor stream of solvent, aromatic isocyanates, carbon monoxide and carbon dioxide from cyclone separator 30 is conveyed through cyclone vapor discharge line 31 to a fractionating column 32. Carbon monoxide and carbon dioxide are removed through fractionating column vapor discharge line 33 and fed to condenser 13 prior to recycle through second gaseous product discharge line 15 to bleed line 15a and blower 16 of FIG. 1. A portion of condensate from condenser 13 is conveyed through first condenser condensate line 34 to fractionating column 32. The remaining portion of the condensate from condenser 13 is conveyed through second condenser condensate line 35 for further processing as described more fully below.

Bottom discharge from cyclone separator 30 is a hot concentrated slurry of catalyst and reaction products which is conveyed through cyclone separator slurry discharge line 36 to a crystallizer 37. In crystallizer 37 the slurry is cooled by means of a coolant fed through coolant feed line 38 to a temperature from about 10 to about 50° C., and preferably in the range from about 20 to about 30° C. to effect crystallization of dissolved catalyst. The cooled slurry is conveyed from crystallizer 37 through crystallizer discharge line 39 to a second slurry separator 40, such as a filter or centrifuge, where it is separated continuously into a solid phase and a liquid phase. Solid phase is conveyed through solid phase discharge line 41 to a cold washing chamber 42 where it is washed with cold solvent, fed through cold solvent feed line 43 from solvent storage 6 of FIG. 1. Cold washed solids are conveyed through cold washed solids discharge line 44 to a hot washing chamber 45.

The remaining portion of the condensate from condenser 13 which is predominately solvent at an elevated temperature is conveyed through condenser condensate line 35 to hot washing chamber 45.

A major portion of the suspension of solids in hot solvent in hot washing chamber 45 is conveyed through hot washing solvent discharge line 46 to feed suspension preparation 3 of FIG. 1. In order to remove organic impurities from the system a minor portion of the hot washing chamber suspension is removed from hot washing chamber 45 through regeneration discharge line 47 and conveyed to a third slurry separator 48, such as a filter or centrifuge, to form a liquid phase and a solid phase. Liquid phase from the third slurry separator is recycled through third slurry separator liquid phase discharge line 49 to feed suspension preparation 3 of FIG. 1. Solid phase from third slurry separator 48 is conveyed through third slurry separator solid phase discharge line 50 to dryer 51 where it is heated to a temperature of between about 100 and about 180° C. and preferably between about 125 and about 150° C. to remove entrained liquids. The dried solids are conveyed through dryer solid discharge line 52 to roaster 53 where the solids are heated to a temperature above about 550° C., and preferably between about 575 and about 610° C. Organic impurities are burned off the catalyst in roaster 53 and the purified solid catalyst is conveyed through roaster discharge line 54 to a reducing furnace 55 where the catalyst is heated in the presence of hydrogen to effect regeneration thereof. A temperature is maintained in reducing furnace 55 of from about 180 to about 225, and preferably from about 190 to about 210° C. Product from reducing furnace 55 is predominately noble metal in elemental form is conveyed through furnace discharge line 56 to reduced catalyst storage (not shown) or to regeneration step 97, where the noble metal is reacted to form a halide or complex that is useful for recycling through regenerated catalyst line 98 as a catalyst or catalyst component to feed suspension preparation 3 of FIG. 1. For example, the noble metal is regenerated by reacting with a hydrochloride derivative of a heteroaromatic nitrogen compound, such as pyridine hydrochloride, to form a complex of noble metal chloride and heteroaromatic nitroegn compound, such as palladium pyridine dichloride complex, which is useful as a catalyst, as described in U.S. Patent Application Ser. No. 170,286, filed Aug. 8, 1971 by Hammond, Litz and Manemeit.

Liquid residue, which is predominately aromatic isocyanate and solevnt, from the bottom of fractionating column 32 is conveyed by fractionating column liquid residue discharge line 57 to cyclone separator discharge line 36 and then conveyed to crystallizer 37.

Liquid phase in second slurry separator 40 which contains solvent, aromatic isocyanate, unreacted and partially reacted aromatic nitro compounds, if any, conveyed through second slurry separator liquid phase discharge line 58 to a processing operation capable of separating the aromatic isocyanate product therefrom. Preferably it is first combined with cold solvent liquid residue obtained from cold washing chamber 42 through cold solvent residue line 59. Liquids in lines 58 and 59 are preferably combined to form aromatic isocyanate recovery feed line 60 through which they are conveyed to an aromatic isocyanate recovery step such as shown by distillation recovery system 24 in FIG. 1, or to the recovery system described in FIG. 3 beginning with continuous evaporator 61.

Fig. 3 is a schematic diagram of a preferred embodiment of the aromatic isocyanate recovery phase of this invention previously identified as distillation recovery system 24 in FIG. 1. Either the liquid component containing aromatic isocyanate product, solvent, and unreacted or incompletely reacted aromatic nitro compound from liquid component discharge line 23 of FIG. 1 or liquid phase containing solvent, aromatic isocyanate, unreacted and partially reacted aromatic nitro compound, if any, along with cold solvent residue which are combined in aromatic isocyanate recovery feed line 60 of FIG. 2 is fed to continuous evaporator 61. This evaporator is operated under reduced pressure and elevated temperature, causing a portion of the liquid phase to be vaporized. Vapors are conveyed through evaporator vapor discharge line 62 to third condenser 63. The condensate, which contains solvent, aromatic isocyanate, and partially reacted aromatic nitro compound, if any, is conveyed through third condenser discharge line 64 to second fractionating column 65.

Concentrate from continuous evaporator 61, which contains aromatic isocyanate, partially reacted aromatic nitro compound and catalyst residue is conveyed through evaporator concentrate discharge line 66 to a second continuous evaporator 67, which is preferably a wiped film evaporator operated at a high vacuum and elevated temperatures, for example from about 160 to about 220° C., and preferably from about 170 to about 190° C. Concentrated slurry residue from second continuous evaporator 67 is conveyed through second evaporator slurry discharge line 68 to either feed suspension preparation 3 of FIG. 1 or dryer 51 in the catalyst regeneration section of FIG. 2.

Vapor phase from second continuous evaporator 67 is conveyed through second evaporator discharge line 69 to fourth condenser 70. Condensate from fourth condenser 70 is conveyed through fourth condenser discharge line 71 to either second fractionating column 65, or if desired, is combined with the contents of third condenser discharge line 64 prior to feeding to second fractionating column 65. Second fractionating column 65 may be one or more of a series of fractionating columns provided with appropriate number of distillation plates (not shown) to obtain solvent from the top and a substantially solvent free aromatic isocyanate product from the bottom of second fractionating column 65. Solvent from the top of second fractionating column 65 is conveyed through second fractionating column top discharge line 72 to solvent storage 6 of FIG. 1. Aromatic isocyanate product is conveyed from the bottom of the second fractionating column 65 through second fractionating column bottom discharge line 73 to third fractionating column 74 where a purified aromatic isocyanate product is recovered through vapor discharge line 75 and conveyed to aromatic isocyanate storage 76. Liquid phase from third fractionating column 74, which contains unreacted aromatic nitro compound and reaction by-products, if any, is conveyed through third fractionating column liquid discharge line 77 to feed suspension preparation 3 of FIG. 1.

As indicated above, the aromatic isocyanate product with or without further purification is useful in the preparation of polyurethane compositions.

Any aromatic nitro compound, either unsubstituted or substituted, capable of reacting with carbon monoxide in the presence of a catalyst to form isocyanate may be used as a reactant in the novel process of this invention. Generally the aromatic nitro compound contains from 6 to about 20, and preferably from 7 to about 14 carbon atoms. Typical examples of suitable aromatic nitro compounds include the following:

1. Nitrobenzene
2. Nitronaphthalenes
3. Bis(nitrophenyl)methanes
4. Bis(nitrophenyl)ethers
5. Nitrodiphenoxy alkanes All of the aforementioned compounds may be substituted with one or more additional substituents such as nitro, nitroalkyl, alkyl, alkenyl, alkoxy, aryloxy, halogen, alkylthio, arylthio, carboxyalkyl, cyano, isocyanato, and the like, and employed as reactants in the novel process of this invention. Specific examples of suitable substituted aromatic nitro compounds which can be used are as follows:

1. o-Nitrotoluene
2. m-Nitrotoluene
3. p-Nitrotoluene
4. o-Nitro-p-xylene
5. 2-Methyl-1-nitronaphthalene
6. m-Dinitrobenzene
7. p-Dinitrobenzene
8. 2,4-Dinitrotoluene
9. 2,6-Dinitrotoluene
10. Dinitromesitylene
11. 4,4'-Dinitrodibenzyl
12. Bis(p-nitrophenyl)methane
13. Bis(2,4-dinitrophenyl)methane
14. Bis(p-nitrophenyl)ether
15. Bis(2,4-dinitrophenyl)ether
16. Bis(p-nitrophenoxy)ethane
17. 2,4,6-Trinitrotoluene
18. 1,3,5-Trinitrobenzene
19. 1-Chloro-2-nitrobenzene
20. 1-Chloro-4-nitrobenzene
21. 1-Chloro-3-nitrobenzene
22. 2-Chloro-6-nitrotoluene
23. 4-Chloro-3-nitrotoluene
24. 1-Chloro-2,4-dinitrobenzene
25. 1,4-Dichloro-2-nitrobenzene
26. 1,3,5-Trichloro-2-nitrobenzene
27. 1,3,5-Trichloro-2,4-dinitrobenzene
28. 1,2-Dichloro-4-nitrobenzene
29. 1,2,4-Trichloro-5-nitrobenzene
30. 1-Bromo-4-nitrobenzene 31. 1-Bromo-2-nitrobenzene
32. 1-Bromo-3-nitrobenzene
33. 1-Bromo-2,4-dinitrobenzene
34. 1-Fluoro-4-nitrobenzene
35. 1-Fluoro-2,4-dinitrobenzene
36. 1-Fluoro-2-nitrobenzene
37. m-Nitrophenyl isocyanate
38. p-Nitrophenyl isocyanate
39. o-Nitroanisole
40. p-Nitroanisole
41. p-Nitrophenetole
42. o-Nitrophenetole
43. 2,4-Dinitrophenetole
44. 2,4-Dinitroanisole
45. 1-Chloro-2,4-dimethoxy-5-nitrobenzene
46. 1,4-Dimethoxy-2-nitrobenzene
47. 3,3'-Dimethoxy-4,4'-dinitro-biphenyl
48. 3,3'-Dimethyl-4,4'-dinitro-biphenyl
49. 2-isocyanato-4-nitrotoluene
50. 4-isocyanato-2-nitrotoluene In addition, isomers and mixtures of the aforesaid aromatic nitro compounds and substituted aromatic nitro compounds may also be employed, as well as homologues and other related compounds. Compounds which have both nitro and isocyanato substituents, such as 2-isocyanato-4-nitrotoluene, may also be employed as a reactant.

As used herein, the term "aromatic nitro compounds" represent those aromatic nitro compounds having at least one nitro group attached directly to an aromatic nitro hydrocarbon nucleus, such as benzene, naphthalene, and the like, wherein the aromatic hydrocarbon nucleus may be substituted as illustrated above. Among the preferred aromatic nitro compounds which may be used in the practice of this invention are the nitrobenzenes, both mono- and polynitro, including isomeric mixtures thereof; the nitroalkylbenzenes, including the various nitrated toluenes and the nitrated xylenes; nitrated biphenyl and nitrated diphenylmethylene. Other preferred reactants include bis(nitrophenoxy)alkylenes and bis(nitrophenoxy)alkyl ethers.

Any catalyst capable of enhancing the conversion of aromatic nitro compounds to aromatic isocyanates may be used in the process of this invention. Typical catalysts are mixtures or complexes of a heteroaromatic nitrogen compound and a noble metal halide of the type described in U.S. Pat. No. 3,576,835, issued Apr. 27, 1971, to Eric Smith and Wilhelm J. Schnabel. Preferred catalysts of this type include mixtures or complexes of palladium chloride or rhodium chloride with pyridine, isoquinoline, or quinoline, especially when the aromatic nitro compound is dinitrotoluene. Other useful catalyst systems include the mixture of a chloride of palladium or rhodium with an oxide of vanadium or molybdenum as described in Canadian Pat. No. 802,239, issued Dec. 24, 1968, to Wilhelm J. Schnabel, Ehrenfried H. Kober and Theodore C. Kraus.

Other useful catalyst systems are disclosed in U.S. Pat. No. 3,523,966, which issued Aug. 11, 1970, to Gerhard F. Ottmann, Ehrenfried H. Kober and David F. Gavin, which discloses a catalyst system comprised of a noble metal-based catalyst and selected organophosphorous compounds. Other useful catalyst systems are well known in the art.

The proportion of catalyst system used in the process is generally equivalent to between about 0.001 and about 500 percent, preferably between about 1 and about 100 percent and more preferably between about 20 and about 40 percent by weight of the aromatic nitro compound. However, greater or lesser proportions may be employed if desired.

When a heteroaromatic nitrogen compound is used as a component of the catalyst system, the molar ratio of the heteroaromatic nitrogen compound to the anion of the noble metal compound is generally between about 0.1:1 and about 10:1, and preferably between about 0.5:1 and about 1.5:1, but greater or lesser ratios may be employed if desired.

The catalyst system can be self-supported or deposited on a support or carrier for dispersing the catalyst system to increase its effective surface. Alumina, silica, carbon, barium, sulfate, calcium carbonate, asbestos, bentonite, diatomaceous earth, fuller's earth, and analogous materials are useful as carriers for this purpose.

Suitable solvents include aliphatic, cycloaliphatic and aromatic solvents such as n-heptane, cyclohexane, benzene, toluene and xylene, and halogenated aliphatic and aromatic hydrocarbons such as dichloromethane, tetrachloroethane, trichlorotrifluoroethane, monochloronaphthalene, monochlorobenzene, dichlorobenzene, trichlorobenzene, and perchloroethylene, as well as sulfur dioxide, mixtures thereof and the like. It is preferred to employ dichlorobenzene as the solvent.

The proportion of solvent is not critical and any proportion may be employed which will not require excessively large equipment to contain. Generally the weight percent of aromatic nitro compound in the solvent is in the range between about 2.0 and about 75 percent, but greater or lesser proportions may be employed if desired.

At start-up, carbon monoxide is fed into the autoclave until a pressure is attained, at ambient temperature which is generally between about 30 and about 10,000 p.s.i.g. After the reaction proceeds and heat is applied, the pressure may increase to as high as 30,000 p.s.i.g. The preferred reaction pressure is between about 100 and about 20,000 p.s.i.g. and most preferred between about 1,000 and about 10,000 p.s.i.g. However, greater or lesser pressures may be employed if desired.

Generally the quantity of carbon monoxide in the free space of the reactor is sufficient to maintain the desired pressure as well as provide reactant for the process, as the reaction progresses. If desired, additional carbon monoxide can be fed to the reactor either intermittently or continuously as the reaction progresses. The reaction is believed to progress in accordance with the following equation:

(I) $\quad R(NO_2)_n + 3nCO \rightarrow R(NCO)_n + 2nCO_2$ where R is the organic moiety of the aromatic nitro compound reactant of the type defined above, and $n$ is the number of nitro groups in the aromatic nitro compound. The total amount of carbon monoxide added during the reaction is generally between about 3 and about 50 and preferably between about 8 and about 35 moles of carbon monoxide per nitro group in the organic nitro compound. Greater or lesser amounts may be employed if desired. Recycle of the carbon monoxide containing gas stream in accordance with the process of this invention greatly reduces the overall consumption of carbon monoxide.

The reaction temperature is generally maintained above about 25° C. and preferably between about 100 and about 250° C. Interior and/or exterior heating and cooling means may be employed to maintain the temperature within the reactor within the desired range.

The reaction time is dependent upon the aromatic nitro compound being reacted, temperature, pressure, and on the amount of catalyst being charged, as well as the type of equipment being employed. Usually between 5 and about 300 minutes and preferably between about 10 and about 60 minutes residence time in the reactor is required to obtain the desired degree of reaction.

Further improvement in the conversion and yield of aromatic isocyanates can be obtained by employing a catalyst system which not only contains a catalyst, but also contains discrete particles of iron oxide, as described in U.S. Pat. No. 3,674,827, issued July 4, 1972, to Velliyur Nott Padmanabha Rao, John A. Scott and Benjamin M. Surowiecki, Jr. As also described in the latter patent, a catalyst system may be employed which is comprised of a catalyst, discrete particles of iron and also contains a third component comprised of certain metal oxides. Oxides suitable as a third component of the catalyst system include at least one oxide of an element selected from the group consisting of molybdenum and chromium. Suitable oxides of this type includue chromic oxide ($Cr_2O_3$), chromium dioxide ($CrO_2$), chromic anhydride ($CrO_3$), and chromous oxide (CrO); molybdenum sesquioxide ($Mo_2O_3$), molybdenum dioxide ($MoO_2$), and molybdenum trioxide ($MoO_3$). Mixtures of two or more of these oxides may be employed as one component of the catalyst mixture. The proportion of the third component of the catalyst system, when one is employed, is generally equivalent to a weight ratio of the metal compound to the metal oxide in the catalyst system generally in the range between about 0.0001:1 and about 25:1, and preferably in the range between about 0.005:1 and about 5:1. The addition of these metal oxides is of course not necessary if they are already a component of the catalyst system.

When a metal oxide such as molybdenum trioxide is used as a component of the catalyst system, it is discharged from reaction zone 9 through first slurry reaction product discharge line 18, through cooler 19 to slurry separator 21. The metal oxide component is discharged from slurry separator 21 as a solid component recycle line 22 along with other solids, which may include complexes of palladium chloride with a heteroaromatic nitrogen compound such as pyridine.

The following Examples are presented to describe the invention more fully without any intention of being limited thereby. All parts and percentages are by weight unless otherwise specified.

EXAMPLES 1-4

A continuous reactor system was constructed utilizing as a reactor a 250 milliliter baffled autoclave equipped with a motor-driven agitator, a gaseous inlet for dispersing bubbles of carbon monoxide below the surface of the reaction slurry and a dip tube for feeding a slurry of dinitrotoluene in ortho dichlorobenzene containing catalyst of palladium dichloride pyridine complex. Feed rate of the slurry to the reactor was adjusted to maintain a reactor hold-up at agitated gassed conditions of about 176 grams. The autoclave was also provided with means for withdrawing gas, which was a mixture of carbon monoxide and carbon dioxide, and sufficient carbon monoxide was added to increase the carbon monoxide to carbon dioxide ratio to about 1:1 in the recycle gas feed to the autoclave. Reaction slurry was withdrawn at a rate to provide a retention time in the autoclave of the period indicated in Table II.

Samples of the reaction slurry were taken periodically, filtered, and the resulting filtrate was analyzed to determine conversion and product yield. The average conversion and average product yield for each run is set forth below in Table I.

Each reaction was carried out at a temperature of 250° C., 3000 p.s.i.g. and a feed rate of eight liters of carbon monoxide per minute.

TABLE I

| Example | 1 | 2 | 3 | 4 |
|---|---|---|---|---|
| Retention time, minutes | 59 | 52 | 42.2 | 60 |
| DNT concentration in solvent, percent | 17.8 | 9.7 | 9.3 | 9.11 |
| Conversion, percent | 49.8 | 41.6 | 35.9 | 62.8 |
| Gm. moles DNT converted per liter per hour | .633 | .289 | .239 | .409 |
| Gm. moles $NO_2$ groups converted per liter per hour | .865 | .371 | .337 | .581 |
| Total product yield, percent | 83.5 | 84.6 | 74.1 | 80.2 |
| Percent yield TDI | 19.1 | 12.9 | 14.9 | 22.3 |
| Percent yield 2NCO—4NCO-toluene | 43.9 | 45.4 | 36.3 | 35.5 |
| Percent yield 4NCO—2$NO_2$-toluene | 21.5 | 26.3 | 22.9 | 22.4 |
| Gm. moles unchanged $NO_2$ groups per liter per hour | .664 | .69 | .635 | .546 |
| Gm. moles feed $NO_2$ groups per liter per hour | 2.54 | 1.386 | 1.330 | 1.302 |
| $K_D$ of DNT [1] | .01172 | .01043 | .0107 | .0134 |

[1] Dinitrotoluene.

EXAMPLE 5

The following example represents a typical illustration of how the continuous process described herein may be carried out.

A stainless-steel mixing tank having a capacity of 15,000 gallons and a motor driven agitator with 4 baffles secured perpendicular and vertically to the interior wall of the tank is used to prepare a feed suspension. To the stainless-steel mixing tank are added the following ingredients in the following proportions with agitation:

| Ingredients: | Rate, parts per hour |
|---|---|
| Dinitrotoluene | 17,550 |
| Orthodichlorobenzene | 147,634 |
| Mononitro-mono-isocyanato-toluene | 1,263 |
| Palladium dichloride-isoquinoline complex | 7,020 |
| Molybdenum trioxide | 1,755 |
| Elemental palladium | 258 |
| Toluene diisocyanate* | 20 |

*Residue from a previous reaction.

The resulting uniform slurry is conveyed through feed suspension feed line at the rate of 175,500 parts per hour to a chain of three reactors connected in series, the discharge slurry of the first reactor is used as feed to the second reactor, and discharge of slurry from the second reactor used as feed to the third reactor. Each reactor is a 6,000 gallon stainless-steel autoclave provided with a motor driven agitator, external heating coils which maintain the reaction temperature at approximately 200° C., and a gas sparger positioned in the bottom of the reactor through which carbon monoxide is fed as dispersed minute bubbles. Sufficient carbon monoxide is added through the gas sparger to maintain a pressure in each reactor of approximately 3,000 p.s.i.g. and to provide a molar ratio of carbon monoxide per nitro group in the dinitrotoluene fed to the reactor of approximately 25:1. The slurry level is maintained in the reaction zone at about 75 percent of the height of the reactor, leaving a void space representing about 25 percent of the total volume of the reactor. Residence time of dinitrotoluene in the reactor is approximately 20 minutes.

A first gaseous reaction product is removed from the reactor and separated into two portions. One portion by means of a blower is recycled to the gas sparger in the reactor. The other portion is conveyed to a mixing valve where it is mixed with gaseous evaporator discharge as described more fully below.

Slurry reaction product from the reactor will have the following average analysis and rate of discharge:

| Ingredient: | Rate, parts per hour |
|---|---|
| Ortho-dichlorobenzene | 147,634 |
| Dinitrotoluene | 165 |
| Mononitro-monoisocyanato-toluene | 2,068 |
| Palladium dichloride-isoquinoline complex | 6,669 |
| Molybdenum trioxide | 1,755 |
| Toluene diisocyanate | 12,520 |
| Other $NO_2$-based residues | 3,350 |
| Elemental palladium | 344 |
| Isoquinoline | 208 |
| Chlorine | 57 |
| Dissolved CO and $CO_2$ | 8,650 |
| Total | 183,420 |

The reaction slurry is conveyed to a condenser where the temperature is reduced from about 200° C. to about 35° C., and then fed through an evaporator for further cooling to a temperature of about 25° C. to effect crystallization of the solubilized palladium chloride-isoquinoline complex containing reaction slurry. Gaseous evaporator discharge, which is discharged at the rate of 8,650 parts per hour of a mixture of carbon monoxide and carbon dioxide, is conveyed to a mixing valve where it is mixed with reaction product vapor and the resulting mixture is fed to the bottom of a scrubber maintained at a temperature of about −15° C. Liquid orthodichlorobenzene is fed to the top of a scrubber to remove any entrained solvent in the vapor mixture. The gaseous scrubber discharge, which is predominantly carbon monoxide containing some by-product carbon dioxide, is conveyed by a suitable compressor to the gas sparger in the bottom of the reactor. Liquid scrubber discharge from the bottom of the scrubber is conveyed to a stripper maintained at a temperature from about 100° to about 150° C., where carbon dioxide is removed as the gaseous phase and discharged to the atmosphere. The liquid residue from the stripper is conveyed to a distillation column maintained at a temperature between about 100° and about 150° C. to separate a major proportion of the ortho dichlorobenzene solvent from the liquid scrubber residue. The vapor phase from the top distillation, which is predominantly o-dichlorobenzene, is condensed, cooled and then fed to the top of a scrubber for scrubbing the gaseous mixture previously described.

The cooled concentrated slurry from the first evaporator is conveyed to a filter to separate the solid, which is predominantly spent catalyst, from the liquid phase containing toluene-diisocyanate.

Average analyses and rate of discharge of the wet cake from the filter are as follows:

| Ingredient: | Rate, parts per hour |
|---|---|
| Ortho-dichlorobenzene | 1,667 |
| Molybdenum trioxide | 1,667 |
| Elemental palladium | 344 |
| Total | 3,678 |

The wet filter cake from the filter is divided into two portions, one portion being recycled to the feed suspension preparation step and the other portion being conveyed to the catalyst recovery step for regeneration of the catalyst. Analyses and rate of feed of the portion to the feed suspension preparation and the portion to catalyst recovery are as follows:

| Ingredient | Recycle through reactor rate, parts per hour | To catalyst recovery rate, parts per hour |
|---|---|---|
| Otho-dichlorobenzene | 1,250 | 417 |
| Molybdenum trioxide | 1,250 | 417 |
| Palladium dichloride-isoquinoline complex | 258 | 86 |
| Total | 2,758 | 920 |

Liquid filtrate is discharged from the filter in the following rate and in the following proportions:

| Ingredient: | Rate, parts per hour |
|---|---|
| Ortho-dichlorobenzene | 145,967 |
| Dinitrotoluene | 165 |
| Mononitro-monoisocyanato-toluene | 2,068 |
| Palladium chloride-isoquinoline complex | 6,669 |
| Molybdenum trioxide | 88 |
| Toluene diisocyanate | 12,520 |
| Other $NO_2$-based residues | 3,350 |
| Isoquinoline | 208 |
| Chlorine | 57 |
| Total | 171,092 |

The above identified liquid filtrate is conveyed to a vacuum evaporating crystallizer maintained at a temperature of about 30° C., where the filtrate is heated to evaporate a major portion of the solvent, ortho-dichlorobenzene and to further effect crystallization of the palladium chloride-isoquinoline complex. The vapor phase from the evaporator crystallizer is cooled and conveyed at the rate of 165,640 parts per hour to the feed suspension preparation step. The resulting crystal slurry from the evaporator crystallizer will have the following average analyses and rate:

| Ingredient: | Rate, parts per hour |
|---|---|
| Ortho-dichlorobenzene | 3,327 |
| Dinitro-toluene | 165 |
| Mononitro-monoisocyanato-toluene | 6,669 |
| Molybdenum trioxide | 88 |
| Toluene diisocyanate | 12,520 |
| Other $NO_2$-based residues | 3,350 |
| Isoquinoline | 208 |
| Chlorine | 57 |
| | 45,452 |

The above-identified slurry discharge from the evaporator crystallizer is fed to a second filter to separate crystallized palladium chloride-isoquinoline from the liquid phase. The resulting crystalline palladium chloride-isoquinoline complex, which is recovered as filter cake, is recycled to the feed suspension preparation step at the rate of 6,650 parts per hour. Liquid discharge from the second filter will have the following average analyses and is discharged at the following rate:

| Ingredient: | Rate, parts per hour |
|---|---|
| Ortho-dichlorobenzene | 20,337 |
| Dinitrotoluene | 165 |
| Mononitro-monoisocyanato-toluene | 2,068 |
| Palladium chloride-isoquinoline complex | 19 |
| Molybdenum trioxide | 88 |
| Toluene diisocyanate | 12,520 |
| Other $NO_2$-based residues | 3,350 |
| Isoquinoline | 208 |
| Chlorine | 57 |
| Total | 38,802 |

This resulting filtrate is subjected to distillation to recover a substantially pure toluene diisocyanate product. An overall yield of 80 percent toluene diisocyanate is achieved.

We claim:
1. A continuous process for preparing an aromatic isocyanate which comprises
   A. reacting
      1. an aromatic nitro compound containing from 6 to 20 carbon atoms with
      2. carbon monoxide
      3. in the presence of a solid catalyst system comprised of a mixture of a noble metal halide and a heteroaromatic nitrogen compound and
      4. a solvent
      5. at an elevated temperature and
      6. an elevated pressure in an
      7. agitated reaction zone
   whereby a first gaseous product and a first slurry product are formed,
   B. continuously separating from said reaction zone said first gaseous product containing carbon monoxide and a vaporized solvent,
      1. cooling said first gaseous product to form
         a. a liquid condensate predominating in said solvent
            (1) recycling said solvent to said reaction zone, and
         b. a second gaseous product predominating in carbon monoxide,
            (1) recycling at least a portion of said second gaseous product to said reaction zone,
   C. continuously separating from said reaction zone said first slurry product, containing a solid component suspended in a first liquid component contain- ing said aromatic isocyanate in said solvent, said solid component being comprised of said solid catalyst and solid reaction products formed in said reaction zone,
   1. separating said first slurry product into
     a. said first liquid component,
       (1) distilling said first liquid component to recover (a) said aromatic isocyanate and (b) a second liquid component containing said solvent, and (i) recycling said second liquid component to said reaction zone, and
     b. said solid component
       (1) washing said solid component with a portion of said solvent to form a first washed solid component suspended in the washing solvent,
       (2) separating said washing solvent from said first washed solid component,
       (3) heating said first washed solid component to regenerate said solid catalyst, and
       (4) recycling the resulting regenerated solid component to said reaction zone.

2. The process of claim 1 wherein said solid component (C1b) after separation from said first slurry (C), is
   A. washed with a portion of said solvent (A4),
   B. said washing solvent is separated from the resulting first washed solid
     1. said washing solvent is admixed with said first liquid(C1a) prior to distillation
     2. said first washed solid is washed with a portion of said liquid condensate (B1a)
     3. said washing liquid condensate is separated from the resulting second washed solid
      a. said washing liquid condensate is recycled to said reaction zone, and
      b. said second washed solid is
       (1) dried
       (2) roasted,
       (3) reduced and
       (4) recycled to said reaction zone.

3. The process of claim 2 wherein said catalyst system is
   A. mixture of
     1. a noble metal halide selected from the group consisting of
      a. palladium chloride and
      b. rhodium chloride and
     2. a heteroaromatic nitrogen compound selected from the group consisting of
      a. pyridine
      b. isoquinoline and
      c. quinoline and
   B. complexes of (A1) and (A2).

4. The process of claim 3 wherein said second washed solid is
   A. heated to a temperature between about 100 and about 180° C. to effect drying thereof,
   B. heated to a temperature above 550° C. to effect roasting thereof, and
   C. heated to a temperature from about 180 to about 225° C. in a hydrogen atmosphere to effect reduction thereof.

5. The process of claim 1 wherein said first liquid component (C1a) is
   A. heated to evaporate a portion of the liquid vapors and form a condensed first liquid component
     1. cooling the resulting vapors to effect partial condensation thereof,
     2. fractionally distilling the cooled partially condensed vapors to form
      a. an overhead predominating in said solvent, and
       (1) recycling said solvent to said reaction zone,
     b. a bottoms predominating in said aromatic isocyanate and containing reaction by-products and partially reacted said aromatic isocyanates
      (1) fractionally distilling said bottoms to form a (a) an overhead of purified said aromatic isocyanate and (b) a bottoms of unreacted said aromatic isocyanate and partial reacted aromatic isocyanate, (i) recycling said bottoms to said reaction zone,
   B. heating said condensed first liquid component to evaporate additional vapor therefrom,
     1. cooling the resulting vapors to effect partial condensation thereof,
     2. fractionally distilling the cooled partially condensed vapors and further processing as in (A2) above
     3. recycling the resulting second condensed first liquid component to said reaction zone.

6. The process of claim 5 wherein said second condensed first liquid component is dried and further processed as in steps (B3b1–3) of claim 2.

7. The process of claim 5 wherein said catalyst system is a
   A. mixture of
     1. a noble metal halide selected from the group consisting of
      a. palladium chloride and
      b. rhodium chloride and
     2. a heteroaromatic nitrogen compound selected from the group consisting of
      a. pyridine
      b. isoquinoline and
      c. quinoline and
   B. complexes of (A1) and (A2).

8. The process of claim 7 wherein said catalyst system contains a third component comprised of an oxide of a metal selected from the group consisting of vanadium, molybdenum, tungsten, niobium, chromium and tantalum.

9. The process of claim 8 wherein said oxide of a metal is molybdenum trioxide.

10. The process of claim 7 wherein said solvent is ortho dichlorobenzene.

11. The process of claim 10 wherein said aromatic nitro compound is selected from the group consisting of
   A. nitrobenzene
   B. dinitrotoluene and
   C. monoisocyanato-mononitrotoluene.

12. The process of claim 11 wherein said catalyst system is a complex of palladous dichloride and pyridine.

13. The process of claim 12 wherein said catalyst system also contains molybdenum trioxide.

14. The process of claim 1 wherein a portion of said second gaseous product is admixed with additional carbon monoxide prior to feeding to said reaction zone.

15. The process of claim 8 wherein said aromatic nitro compound is also reacted with said carbon monoxide in the presence of discrete particles of an oxide of iron.

16. The process of claim 5 wherein said solvent is selected from the group consisting of n-heptane, cyclohexane, benzene, toluene, xylene, dichloromethane, tetrachloroethane, trichlorotrifluoroethane, monochloronaphthalene, monochlorobenzene, dichlorobenzene, trichlorobenzene, perchloroethylene, sulfur dioxide and mixtures thereof.

References Cited
UNITED STATES PATENTS
3,576,835   4/1971   Smith et al. _____ 260—453

D. H. TORRENCE, Assistant Examiner

LEWIS GOTTS, Primary Examiner